Figure 1:
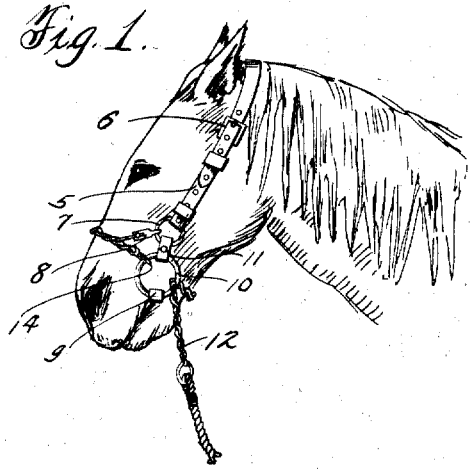

C. F. CRAWFORD.
HORSE RESTRAINING DEVICE.
APPLICATION FILED JULY 31, 1917.

1,252,667.

Patented Jan. 8, 1918.

Witness
G. C. Walling.

Inventor
C. F. Crawford
By Chandler & Chandler
Attorney

UNITED STATES PATENT OFFICE.

CHARLES F. CRAWFORD, OF LIBERTY, NEW YORK.

HORSE-RESTRAINING DEVICE.

1,252,667. Specification of Letters Patent. Patented Jan. 8, 1918.

Application filed July 31, 1917. Serial No. 183,788.

*To all whom it may concern:*

Be it known that I, CHARLES F. CRAWFORD, a citizen of United States, residing at Liberty, in the county of Sullivan, State of New York, have invented certain new and useful Improvements in Horse-Restraining Devices; and I do hereby declare the following to be a full, clear, and exact description of the invention, such as will enable others skilled in the art to which it appertains to make and use the same.

This invention relates to restraining devices for horses and other draft animals and has for an object to provide in conjunction with a bridle, means of novel arrangement and manipulation through the medium of which an animal may be effectually restrained and controlled should it become stubborn or fractious.

With the above and other objects of similar nature in view, the invention consists in the construction, combination and arrangement of parts, set forth in and falling within the scope of the appended claims.

In the drawing:—

Figure 2:
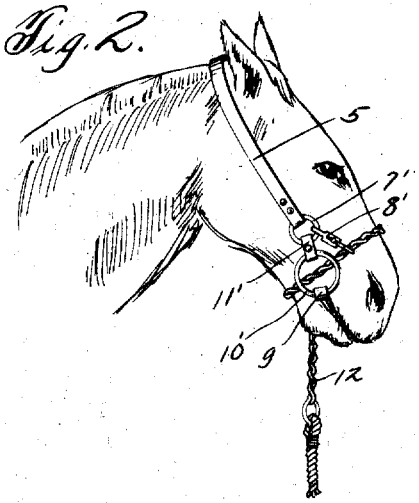
Figure 2:
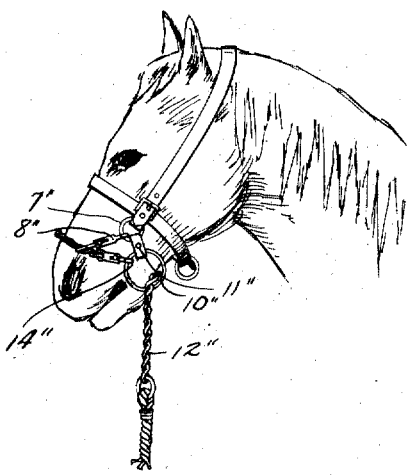
Figure 3:
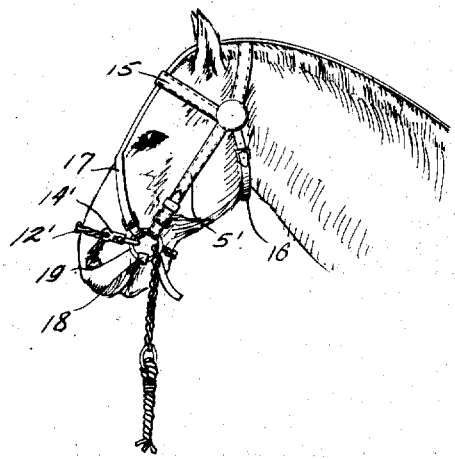

Figure 1 is a side elevation of a bridle applied to an animal's head and embodying the invention, Fig. 2 is a view showing the opposite side of the device, Fig. 3 illustrates another manner of employing the device and, Fig. 4 is a perspective view of a slightly modified form of the restraining member associated with a halter of conventional type.

Referring now more particularly to the accompanying drawing, there is shown a bridle consisting of a pair of cheek straps 5 one of which is longer than the other and is carried over the head and behind the ears of an animal as shown in Figs. 1 and 2, and is adjustably connected with the other strap through the medium of a buckle 6. At the lower ends of the cheek straps there are attached rings 7 and 7' respectively equipped with snap hooks 8 and 8' respectively of the ordinary type. A bit 9 of ordinary construction is provided and equipped at its ends with the usual rings 10 and 10' respectively while connecting said rings 10 and 10' with the corresponding rings 7 and 7' are short lengths of strap 11 and 11' respectively. The restraining member is shown at 12 and consists of a length of flexible chain that is provided at one end with a snap hook 14 said hook being engaged with one of the bit rings 10 and then passed over and around the nose of the animal to which the bridle is applied, its free end being then engaged loosely through the ring 10.

In order to prevent the restraining member from slipping downwardly on the animal's nose the snap hook 8 is engaged in one of the links of the chain while the hook 8' engages about the chain which is slidable loosely through the hook 8' so that the hook 8' does not interfere with its operation as will be evident from the drawing. Thus should the animal become stubborn or restive it may be readily controlled by grasping and pulling upon the free end of the chain 12, the latter being in this manner drawn tightly about the animal's nose so as to strangle and retard its breathing and cause it to desist in its efforts.

In Fig. 3 of the drawing, there is shown a slightly modified form of the invention the same being associated with a bridle of ordinary construction having no rings corresponding to the ring 7 and including the usual cheek straps 5', head strap 15, throat latch 16, nose strap 17, and bit 18 connected to the cheek straps through the medium of the rings 19 of the bit. In this form of the invention, the restraining member consists merely of the chain 12' such as is employed in Figs. 1 and 2, the same being attached by its snap hook 14' to one ring 19 and being passed around the animal's nose and through said ring 19 just as in the previously described construction while its manner of use is also the same. It is thus evident that the chain 12 may be manufactured and inexpensively sold as an article that may be associated with a bridle of ordinary type, when the purchaser does not desire the complete article illustrated in Figs. 1 and 2.

If desired, the device may be manufactured and marketed without the cheek straps 5 shown in Fig. 1 so that it may be employed in connection with an ordinary halter or bitless bridle. This type of the article is shown in Fig. 4 of the drawing as applied to a halter, the construction, arrangement and operation of the parts 7", 8", 10", 11", 12", and 14" being identical with that in Figs. 1 and 2.

What I claim is:—

1. A restraining bridle for horse or other animals including a pair of cheek straps, rings at the lower ends of the cheek straps, a snap hook carried by each of said rings, a bit, rings at the ends of the bit, means connecting the bit rings with the first named rings, and a flexible chain connected at one end to one of the bit rings adapted to be passed around the nose of an animal and disposed with its other end engaged loosely through the ring to which it is connected, the snap hook adjacent the attached end of the chain being engaged in an adjacent link of the chain and the other snap hook slidably receiving the chain.

2. A restraining attachment for bridles consisting of a bit, rings at the ends of the bit, other rings connected loosely with the first named rings, snap hooks carried by the second named rings, and a restraining chain at one end to one of the first named rings adapted to be passed loosely around the nose of an animal with its other end engaged loosely through the ring to which it is attached and said snap hooks being adapted for fixed and slidable connection with said chain.

In testimony whereof, I affix my signature in the presence of two witnesses:

CHARLES F. CRAWFORD.

Witnesses:
SOLOMON A. ROYCE,
ROBERT HARBY.